US008787344B2

(12) United States Patent
Malladi et al.

(10) Patent No.: US 8,787,344 B2
(45) Date of Patent: Jul. 22, 2014

(54) METHOD AND APPARATUS FOR ACKCH WITH REPETITION IN ORTHOGONAL SYSTEMS

(75) Inventors: Durga Prasad Malladi, San Diego, CA (US); Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 11/847,296

(22) Filed: Aug. 29, 2007

(65) Prior Publication Data
US 2008/0095109 A1 Apr. 24, 2008

Related U.S. Application Data

(60) Provisional application No. 60/841,474, filed on Aug. 30, 2006.

(51) Int. Cl.
*H04B 7/208* (2006.01)

(52) U.S. Cl.
USPC .............................. 370/344; 370/345; 370/347

(58) Field of Classification Search
None
See application file for complete search history.

(56) References Cited

U.S. PATENT DOCUMENTS

| 6,137,990 | A | 10/2000 | Javitt |
| 7,099,298 | B2 | 8/2006 | Kim |
| 7,372,831 | B2 * | 5/2008 | Kim et al. ............ 370/328 |
| 7,508,842 | B2 * | 3/2009 | Baum et al. .......... 370/468 |
| 7,924,805 | B2 * | 4/2011 | Nishibayashi et al. ... 370/346 |
| 7,957,334 | B2 * | 6/2011 | Fujii et al. .......... 370/315 |
| 7,990,911 | B2 * | 8/2011 | Sutivong et al. ....... 370/328 |
| 8,005,127 | B2 * | 8/2011 | Whinnett ............ 375/141 |
| 8,042,018 | B2 * | 10/2011 | Heo et al. ............ 714/748 |
| 2003/0067907 | A1 * | 4/2003 | Rezaiifar et al. ....... 370/349 |
| 2003/0076783 | A1 | 4/2003 | Das et al. |
| 2003/0217319 | A1 * | 11/2003 | Tripathi et al. ....... 714/751 |
| 2004/0006732 | A1 | 1/2004 | Lundby |
| 2004/0156335 | A1 * | 8/2004 | Brethour et al. ...... 370/329 |
| 2004/0223478 | A1 * | 11/2004 | Fischer et al. ....... 370/338 |
| 2004/0258096 | A1 * | 12/2004 | Yoon et al. ......... 370/498 |
| 2005/0002368 | A1 | 1/2005 | Kwon et al. |
| 2005/0135318 | A1 * | 6/2005 | Walton et al. ....... 370/338 |
| 2005/0165949 | A1 * | 7/2005 | Teague ............. 709/236 |

(Continued)

FOREIGN PATENT DOCUMENTS

| EP | 1304825 | 4/2003 | |
| EP | 1304825 A1 * | 4/2003 | ........ H04L 1/00 |

(Continued)

OTHER PUBLICATIONS

Zhang, Xing. "An Effiecient Multiuser Frequency_Time Grid (FTG) Allocation Algorithm for OFDM-based Broadband Wireless Systems". IEEE 2004.*

(Continued)

*Primary Examiner* — Ayaz Sheikh
*Assistant Examiner* — Faiyazkhan Ghafoerkhan
(74) *Attorney, Agent, or Firm* — Dalei Dong

(57) ABSTRACT

A method and apparatus for a wireless communication system, using a repetition factor to determine how many times a acknowledgement should be repeated in response to receiving a first data transmission, selecting an acknowledgement transmission (ACK TX) pattern, wherein the ACK TX pattern comprises of resources information of a plurality of blocks used for transmitting the first acknowledgement, and transmitting, repeatedly, the acknowledgement according to the ACK TX pattern.

47 Claims, 12 Drawing Sheets

(56) References Cited

U.S. PATENT DOCUMENTS

| | | | |
|---|---|---|---|
| 2005/0238016 A1* | 10/2005 | Nishibayashi et al. | 370/389 |
| 2005/0265302 A1* | 12/2005 | Nishibayashi et al. | 370/349 |
| 2006/0035594 A1* | 2/2006 | Murata et al. | 455/67.13 |
| 2006/0035664 A1* | 2/2006 | Murata et al. | 455/550.1 |
| 2006/0146705 A1* | 7/2006 | Waxman | 370/230 |
| 2006/0251015 A1* | 11/2006 | Khan | 370/329 |
| 2006/0256709 A1* | 11/2006 | Yang | 370/206 |
| 2007/0014237 A1* | 1/2007 | Nishibayashi et al. | 370/229 |
| 2007/0041311 A1* | 2/2007 | Baum et al. | 370/208 |
| 2007/0097927 A1* | 5/2007 | Gorokhov et al. | 370/335 |
| 2007/0253467 A1* | 11/2007 | Yang | 375/141 |
| 2007/0254662 A1* | 11/2007 | Khan et al. | 455/436 |
| 2008/0086669 A1* | 4/2008 | Cheng et al. | 714/748 |

FOREIGN PATENT DOCUMENTS

| | | |
|---|---|---|
| EP | 1575205 A2 | 9/2005 |
| JP | 05030115 | 2/1993 |
| JP | 08154096 | 6/1996 |
| JP | H10215246 A | 8/1998 |
| JP | 2003143645 A | 5/2003 |
| JP | 2005505148 T | 2/2005 |
| JP | 2005061640 A | 3/2005 |
| JP | 2005253086 A | 9/2005 |
| JP | 2006086551 A | 3/2006 |
| JP | 2007096425 A | 4/2007 |
| RU | 2235437 | 2/2004 |
| TW | I264195 | 10/2006 |
| TW | I266495 | 11/2006 |
| TW | I269549 | 12/2006 |
| WO | WO-02065664 A2 | 8/2002 |
| WO | WO03019376 A1 | 3/2003 |
| WO | WO2005064840 A1 | 7/2005 |
| WO | WO2005088886 A1 | 9/2005 |
| WO | WO2005119959 A1 | 12/2005 |

OTHER PUBLICATIONS

Zhang, Xing. "An Effiecient Multiuser Frequency_Time Grid (FTG) Allocation Algorithm for OFDM-based Broadband Wireless Systems". IEEE 2004, pp. 2092-2096.*

International Search Report—PCT/US07/077180—International Search Authority—European Patent Office—May 19, 2008.

Written Opinion—PCT/US2007/077180, International Search Authority, European Patent Office, May 19, 2008.

European Search Report—EP11171529—Search Authority—The Hague—Jul. 21, 2011.

Qualcomm Europe; "Considerations on Multiplexing of Control and User Data for xFDMA based E-UTRA Uplink Evaluation," 3GPP TSG-RAN WG1 #42bis, Document#R1-051102, San Diego, CA, USA, pp. 1-6, XP002446638, Oct. 10, 2005.

Samsung: "DL ACK/NACK signalling performance evaluation [online]", 3GPP TSG-RAN WG1#45 R1-061316, May 2006. <URL:http://www.3gpp.org/ftp/tsg_ran/WG1_RL1/TS GR1_45/Docs/R1-061316.zip>,.

Taiwan Search Report—TW096132380—TIPO—Jun. 23, 2011.

* cited by examiner

METHOD AND APPARATUS FOR ACKCH WITH REPETITION IN ORTHOGONAL SYSTEMS

CROSS-REFERENCE TO RELATED APPLICATIONS

This application claims the benefit of U.S. Provisional Patent application Ser. No. 60/841,474 entitled "METHOD AND APPARATUS FOR ACKCH WITH REPETITION IN ORTHOGONAL SYSTEMS" which was filed Aug. 30, 2006. The entirety of the aforementioned applications is herein incorporated by reference.

BACKGROUND

I. Field

The following description relates generally to wireless communications, and more particularly to providing a mechanism for repeating ACK for a receive data transmission using a transmission pattern.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

In a wireless communication system, a Node B (or base station) may transmit data to a user equipment (UE) on the downlink and/or receive data from the UE on the uplink. The downlink (or forward link) refers to the communication link form the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or other purposes.

In state of art systems, a hybrid automatic retransmission (HARQ) process is employed to improve reliability of data transmission (e.g. data packets or data assignment packets). In the system using HARQ process, the transmitter transmits data packets to a receiver and the receiver transmits acknowledgement (ACK if the data packets are processed successfully or NAK if the data packets are not processed successfully) in response. After the transmitter transmits the data packet, the transmitter awaits for reception of the ACK/NAK for a preset period of time before automatically retransmitting the data packet. If transmitter receives the ACK before the timer expires, the transmitter ends the HARQ process and begins another one, if any. If transmitter receives the NAK or the timer expires, the transmitter sets up another HARQ process and retransmits the data packet. However, if the ACK was transmitted by the receiver, but the transmitter was not able process it or did not receive the ACK before the time expired or the ACK/NAK transmissions are not reliable, the transmitter sets up another HARQ process and retransmits the data packet. This is very inefficient and causes delays in delivery of data. Thus, it is desirable to improve the reliability of ACK/NAK transmissions using an ACK/NAK repetition scheme, using an efficient transmission pattern in frequency and time to transmit ACK/NAK in order to improve system performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance to an aspect, a method for a wireless communication system, using a repetition factor to determine how many times a first acknowledgement should be repeated in response to receiving a first data transmission, selecting an acknowledgement transmission (ACK TX) pattern, wherein the ACK TX pattern comprises of resources information for a plurality of blocks used for transmitting the first acknowledgement, and transmitting, repeatedly, the first acknowledgements according to the ACK TX pattern.

In accordance with an aspect, a method for a wireless communication system, transmitting a first acknowledgement in response to receiving a first data transmission using a first set of tones and first set of symbols of a frame, and transmitting the first acknowledgement in response to receiving the first data transmission using a second set of tones and second set of symbols of a frame, wherein the first set of tones and the second set of tones are orthogonal to each other and the first set of symbols and second set of symbols are orthogonal to each other.

In accordance with another aspects, a method for a wireless communication system, determining a maximum repetition factor that indicates the number of time a first acknowledgement will be received, determining a first transmission pattern using the maximum repetition factor, wherein the first transmission pattern comprises of resources information for a plurality of blocks used for receiving the first acknowledgement, and allocating resources based on the first transmission pattern for receiving the first acknowledgement.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
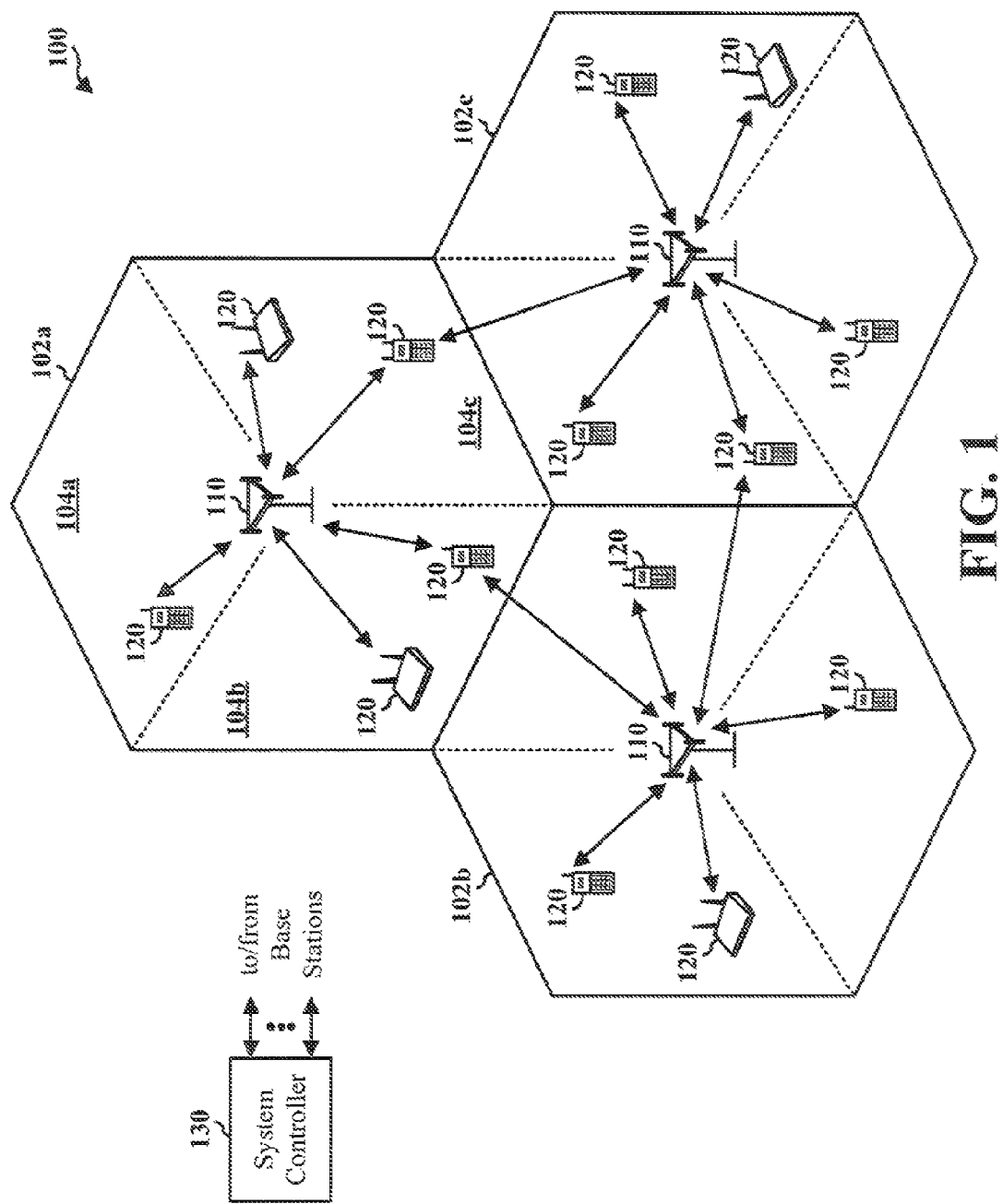
FIG. 1 illustrates a wireless communication system in accordance with various aspects set fort herein.

Various aspects are now described with reference to the drawings, wherein like reference numerals are used to refer to like elements throughout. In the following description, far purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides repeating ACK channel in an orthogonal system. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object an executable, a thread of execution, a program, and/or a computer. One or more component may reside within a process and/or thread of execution and a component may be localized on one computer and/or distributed between two or more computers. Also, there components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "of" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestial Radio Access (UTRA), cdma2000, etc. UTRA includes Wideband-CDMA (W-CDMA) and Low Chip Rate (LCR), cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for uplink transmission in LTE, and 3GPP terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

FIG. 1 illustrates a wireless communication system 100 with multiple multiple base stations 110 and multiple terminals 120, such as may be utilized in conjunction with one or more aspects. A base station is generally a fixed station at communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and or the communication system. Additional channels of the forward link (e.g., control channel) may be transmitted from multiple access points to one access terminal. Reverse link data communication may occur from one access terminal to one or more access points.

Figure 2:
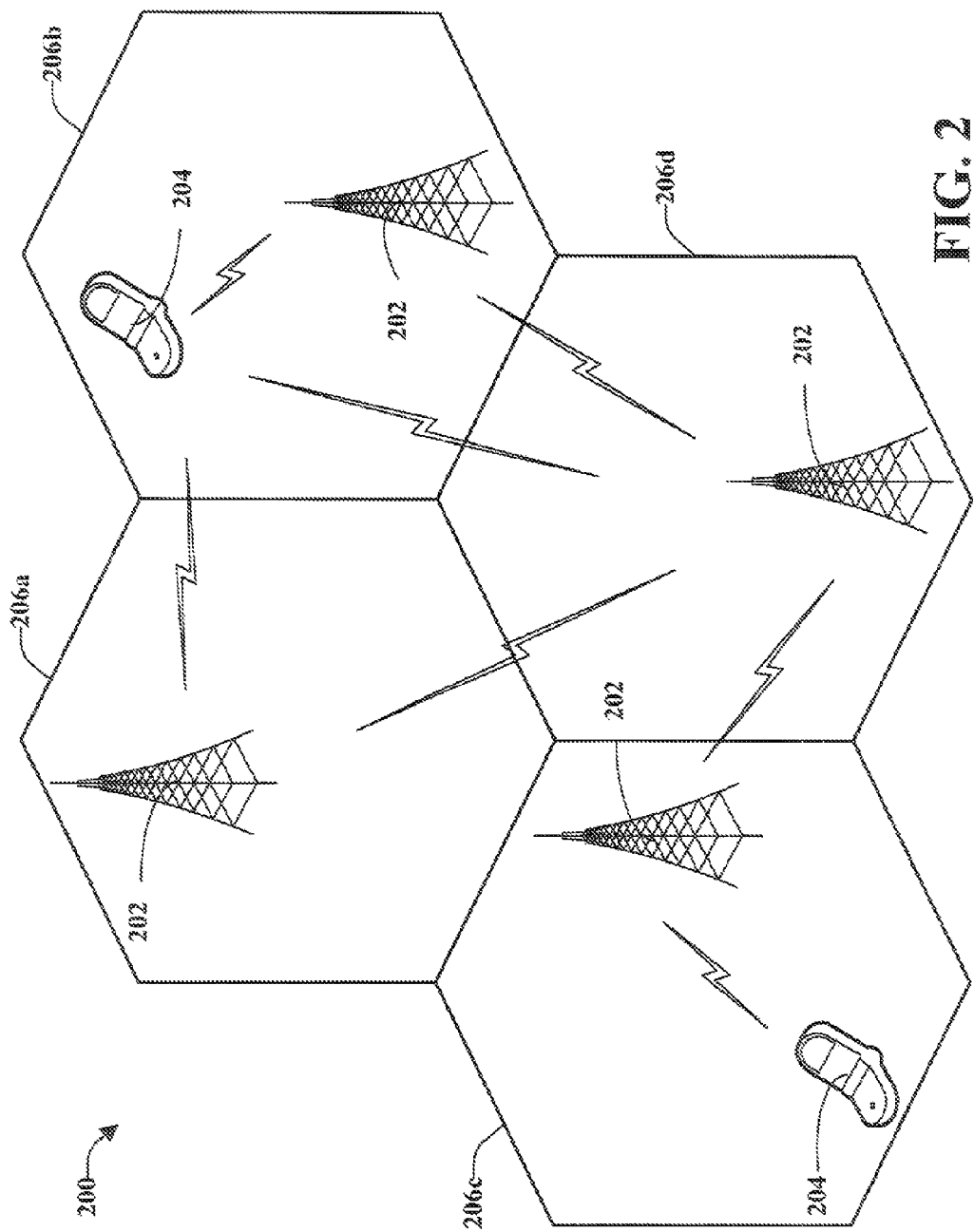
FIG. 2 depicts an example communications apparatus for employment with a wireless communications environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 may be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to a flexible pilot patterns.

The transmission techniques described herein may be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarrier, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz. N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and unlink, downlink transmissions may be set in some time periods, and uplink transmissions may be sent in other time periods.

The LTE downlink transmission scheme is partitioned by radio frames (e.g. 10 ms radio frame). Each frame comprises a pattern made of frequency (e.g. subcarrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more subcarrier and one or more OFDM symbol. One or more resource blocks may be used for transmission of data, control information, pilot or any combination thereof.

A hybrid automatic retransmission (HARQ) is employed to improve reliability of data transmission. For example, in most systems, the HARQ may employed for the physical downlink shared channel (PDSCH) or physical uplink shared channel (PUSCH), both of them simply referred to as shared data channel (SDCH), wherein the data packets are re-transmitted at L1 based on ACK/NAK transmitted from the UE using an acknowledgement channel (ACKCH). For HARQ on the downlink, the Node B may send a transmission or a packet and may send one or more retransmissions until the packet is decoded correctly by the UE, or the maximum number of retransmissions has been sent, or some other termination condition is encountered.

An HARQ process may refer to all transmission and retransmissions, if any, for a packet. An HARQ process may be started when resources are available and may terminate after the first transmission or after one or more subsequent retransmissions. An HARQ process may have a variable duration that may depend on the decoding results at the receiver. An HARQ process may be for a one UE or multiple UE operating in a system. Each HARQ process may be sent on one HARQ interface. In an aspect, each HARQ process may be sent on one HARQ interlace (e.g. sub-frame, slot, resource block, etc.).

For example, when the resources and data are ready, the Node B transmits a data packet to UE. If the data packet is received by the UE, the UE may transmit an ACK if the data packet was successfully processed or send an NAK if the there was an error in decoding the data packet. In response, the Node B may retransmit the same packet if NAK was received or a timer expired before receiving any acknowledgement.

Figure 3:
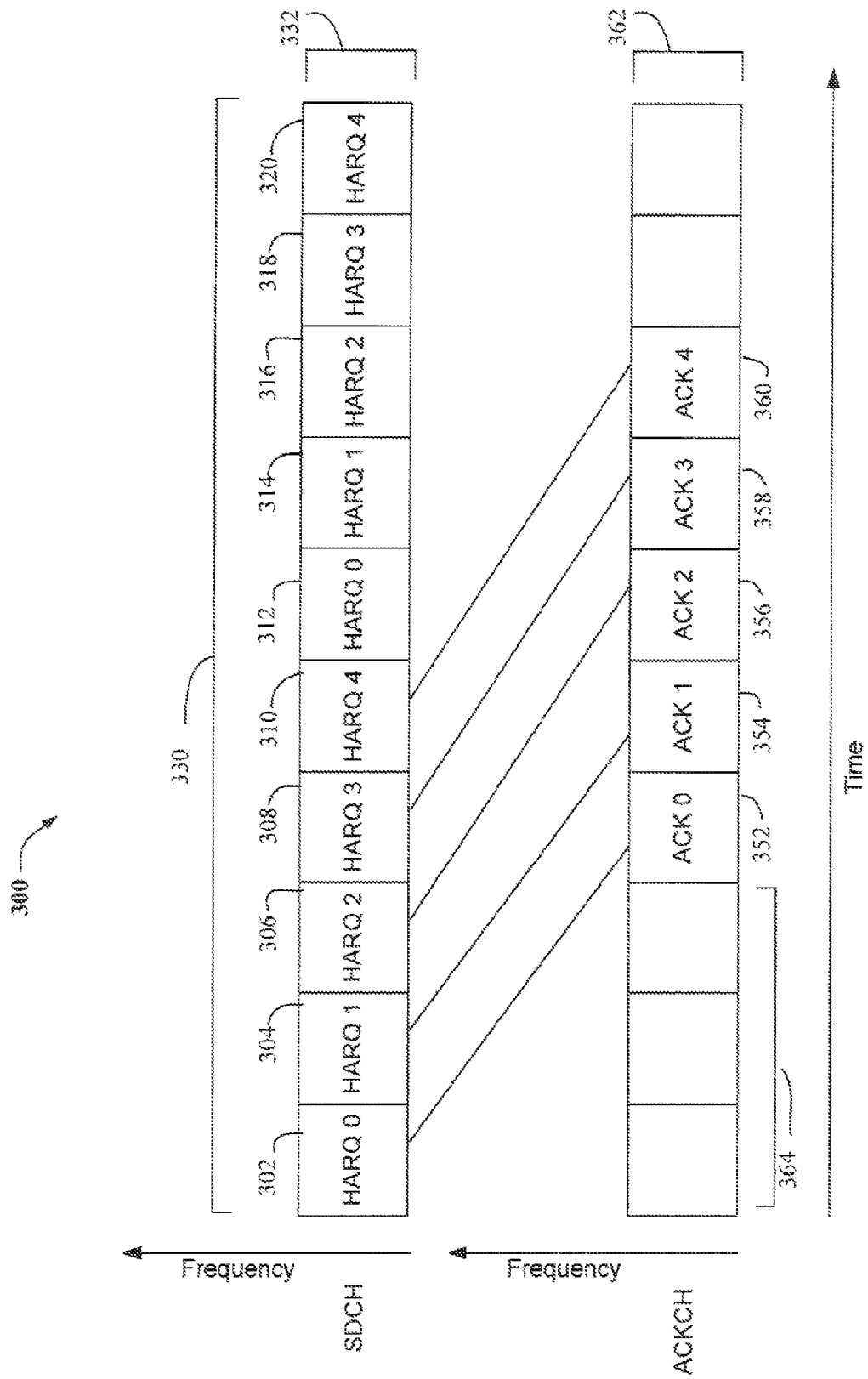
FIG. 3 shows transmission patterns of downlink and uplink using an HARQ scheme.

FIG. 3 illustrates a downlink and uplink transmission process 300 for an HARQ process for SDCH or the downlink and ACKCH on the uplink according to an aspect. A HARQ process on SDCH and associated ACK/NAK process is shown for a radio frame 330 of an LIE system. As an example, 5 HARQ processes may be employed on different sub-frames of the 10 ms radio frame 330. Each HARQ process may be scheduled to transmit data to a different UE or same UE. This depends on the scheduler of a system. The number of HARQ processes that may be employed during a radio frame depend on system requirement. As an example, the 5 HARQ process are shown as two set of repeating HARQ process (e.g. HARQ 0-HARQ 4). First set comprises virtual resource blocks 302-310 and second set comprises virtual resource blocks 312-320. Each resource block use for the downlink is made of set of tones and symbols. The location in frequency for each resource block of the two sets is the same. The resource block may be the entire sub-frame or a portion of the sub-frame designated for SDCH. For clarity, the HARQ process described herein will be for the first set virtual resource blocks 302-310. The bandwidth (e.g. number of sub-carriers and OFDM symbols) allocated to each virtual resource block may vary based on system requirements.

For each HARQ process 302-310 on the downlink (e.g. using SDCH), there is a corresponding ACK/NAK transmission 352-360 on the uplink (e.g. using ACKCH). Each resource block used for the uplink is made of set of tones and symbols. The location in frequency for each resource block of the two sets is the same. The resource block may be the entire sub-frame or a portion of the sub-frame designated for SDCH. The bandwidth (e.g. number of sub-carriers and OFDM symbols) allocated to each virtual resource block may vary based on system requirements.

In HARQ, for every data packet sent using a HARQ process on the SDCH, for example HARQ 0, there is a ACK/NAK transmission using ACKCH, for example ACK 0. The information needed for setting up of ACKCH maybe sent a priory using a different channel. In an aspect, the frequency location for each virtual resource block used for ACKCH on the uplink may be an implicit function of the corresponding frequency location of SDCH on the downlink. This, in this example, the start location of frequency of 332 within a sub-frame on the downlink is the same start location of frequency of 362 within a sub-frame on the uplink. Also, as shown in FIG. 3, the location in time for each virtual resource block used for ACKCH on the uplink may be an implicit function of the corresponding location in time of SDCH on the downlink.

In an aspect, the start time location for ACKCH corresponding to HARQ process is offset, shown at 364.

Figure 4:
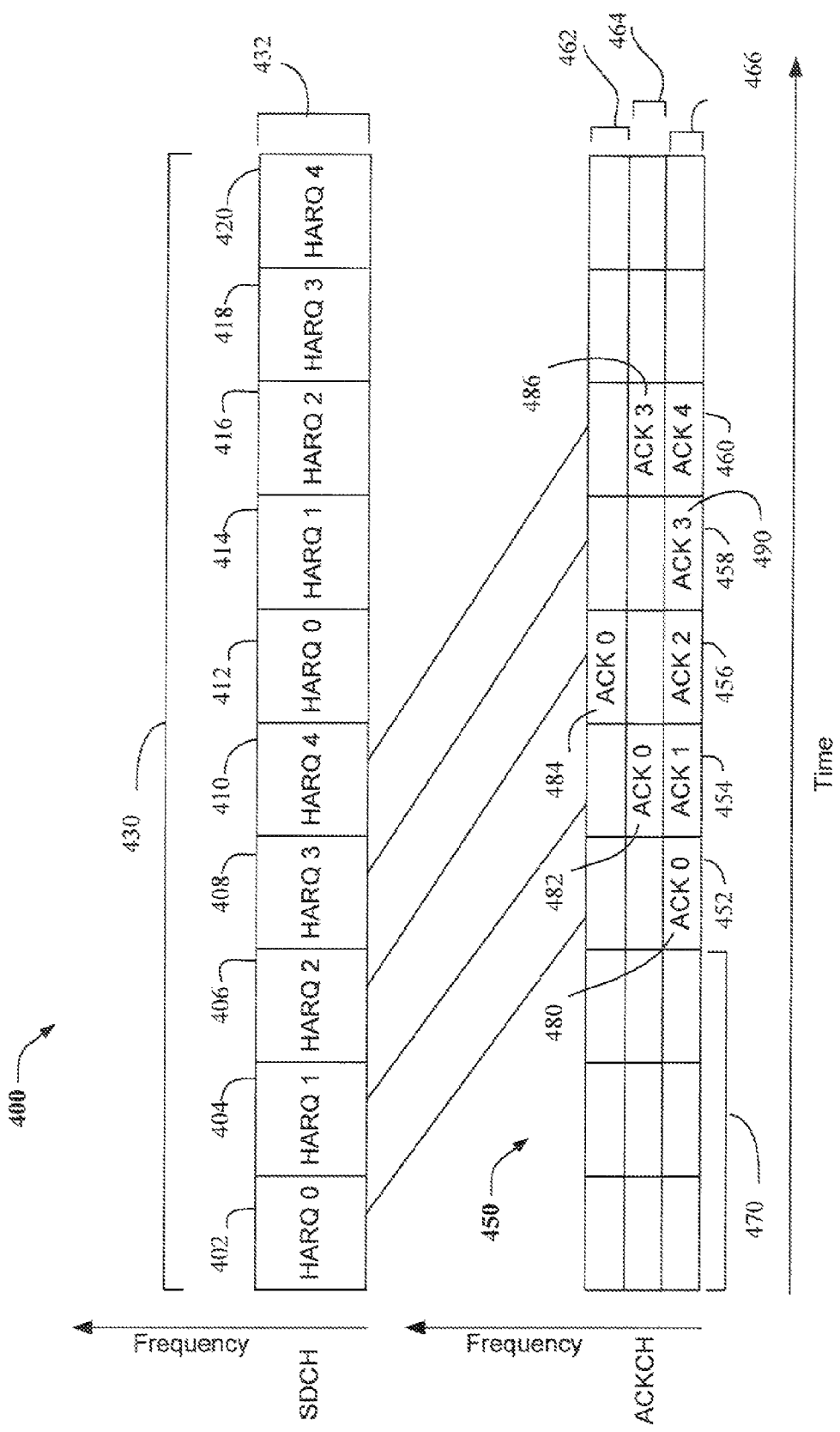
FIG. 4 shows transmission patterns of downlink and uplink using an HARQ scheme.

FIG. 4 illustrates a downlink and uplink transmission process 400 for an HARQ process for SDCH on the downlink and a HARQ scheme for transmitting ACK/NAK for ACKCH on the uplink according to an aspect. The HARQ process according to an aspect provides for an HARQ process for transmitting ACK/NAK using transmission pattern 450. The ACK/NAK transmission pattern 450 many be selected based various factors, for example the number times the ACK/NAK is required to be repeated. In an aspect, there is an implicit mapping between the corresponding DL data resource (e.g. HARQ process resources) and UL ACK transmission pattern (e.g. ACK/NAK transmission resources). The pattern may be one or more resource blocks defined by time, frequency and code. In an aspect, the ACK/NAK transmission pattern may be an implicit function of the time and frequency location of corresponding data packet. In an aspect, the ACK/NAK transmission pattern may be an implicit function of the time and frequency location of corresponding data assignment packet (e.g. control channel, such as PDCCH (Physical Downlink Control Channel)).

A HARQ process on SDCH and associated ACK/NAK process is shown for a radio frame 430 of an LTE system. As an example, 10 HARQ processes may be employed on different sub-frames of the 10 ms radio frame 430. Each HARQ process may be scheduled to transmit data to a different UE or same UE. This depends on the scheduler of a system. The number of HARQ processes that may be employed during a radio frame depend on system requirement. For illustration, 10 HARQ process are shown as two set of repeating HARQ process (e.g. HARQ 0-HARQ 4). First set comprises virtual resource blocks 402-410 and second set comprises virtual resource blocks 412-420. Each resource block use for the downlink is made of set of tones and symbols. The location in frequency for each resource block of the two sets is the same. The resource block may be the entire sub-frame or a portion of the sub-frame designated for SDCH. For clarity, the HARQ process described herein will be for the first set virtual resource blocks 402-410. The bandwidth (e.g. number of sub-carriers and OFDM symbols) allocated to each virtual resource block may vary based on system requirements.

For each HARQ process 402-410 on the downlink (e.g. using SDCH), there is a corresponding ACK/NAK transmission 452-460 on the uplink (e.g. using ACKCH). Each resource block used for the uplink is made of set of tones and symbols. The location in frequency for each resource block for downlink is the same. The resource block for the downlink may be the entire sub-frame or a portion of the sub-frame designated for SDCH. The bandwidths (e.g. number of sub-carriers and OFDM symbols allocated to cacti virtual resource block may vary based on system requirements.

In an aspect, the ACK/NAK may be repeated for data packets sent using a HARQ process. In order to reduce overhead by explicitly notifying each UE the location and time when to transmit the repeated acknowledgements, the resources are allocated for each transmission using multiple ACKID. In an aspect, the frequency used for ACKCH is divided into plurality sets of tones 462, 464 and 466. In an aspect, for a radio frame each resource block of ACKCH is divided in frequency into a plurality of sub-blocks, wherein each sub-block may be assigned about the same set of tones 462, 464 and 466. For each ACK/NAK transmission, a sub-block is used carry out the transmission. The number of sub-blocks designated for ACK/NAK transmission depends on the number ACK/NAK transmission required for a data packet. In an aspect, the sub-blocks used for transmission of ACK/NAK are orthogonal in time and in frequency. This frequency division of ACKCH is available in LTE system which is not deployed at the time of invention.

The division in frequency may depend on the maximum number of re-transmission required by a UE in the system. For example, if a UE is required to re-transmit ACK/NAK with repetition factor of three, then the virtual resource blocks of ACKCH for a radio frame are divided in frequency by three; or if a UE is required to re-transmit ACK/NAK with repetition factor of two, then the virtual resource blocks of ACKCH for a radio frame are divided in frequency by two. The division of ACKCH frequency on the uplink may vary from one radio frame to another and the division applies to all the resource blocks within a radio frame. In aspect, the maximum repetition factor any UE or data packet may be limited to three, thus the frequency allocated to ACKCH will be divided by three.

In an aspect, the repetition factor use may be dynamically modified or preset for each HARQ process. The repetition factor may limited based on maximum frequency allocated to ACKCH and minimum frequency required to properly transmit ACK/NAK. In an aspect, the repetition factor may be different for each frame. The repetition factor may be requested by a UE or assigned to a UE based on measured conditions. The repetition factor may be preset for a particular Node B and for duration. The repetition factor may be calculated based on available bandwidth. The repetition factor may be calculated based on number of ACK/NAK not received by the Node. The Node B may adjust the repetition factor for a HARQ process which depends on number of times Node B retransmitted because Node B did not receive any acknowledgement from UE. Also, the repetition factor may be provided a priori using higher layer signaling. The repetition factor may be provided at the time of ACKCH assignment. In an aspect, the Node B continuously analyzes the number of ACKs received, number ACKs discarded (b/c the first ACK was received properly) and number ACK not received. Using this data, the Node B may adjust the repetition factor for a UE.

Referring back to FIG. 4, the uplink transmission pattern 450 is described herein as an example pattern according to an aspect based on maximum repetition factor of three. In this example, data for HARQ process 0 is transmitted to a UE that requires repeating the ACK/NAK by a repetition factor of three; data for HARQ process 1 is transmitted to a UE that requires repeating the ACK/NAK by a repetition factor of one; data for HARQ process 2 is transmitted to a UE that requires repeating the ACK/NAK by a repetition factor of one; data for HARQ process 3 is transmitted to a UE that requires repeating the ACK/NAK by a repetition factor of two; and data for HARQ process 4 is transmitted to a UE that requires repeating the ACK/NAK by a repetition factor of one.

In an aspect, the time and frequency location for the first ACK/NAK may be function of time and frequency location of either corresponding data packet or data assignment. For example, data transmission at sub-frame (or resource block) K, the corresponding transmission of first ACK/NAK is at sub-frame K+4 using resource A (for example, resource sub-block 480). The time and frequency location for subsequent repeated ACK/NAK for the same data transmission may be a function of time and frequency location of either same data packet or data assignment. For example, data transmission at sub-frame K, the transmission of second ACK/NAK for the same data transmission is at sub-frame K+5 using resource B (for example, resource sub-block 482), data transmission at sub-frame K, the transmission of second ACK/NAK for the same data transmission is at sub-frame K+6 using resource C (for example, resource sub-block 484), etc. The resources A, B and C may represent times and frequency, code, channels, etc.

The corresponding ACK for HARQ process, an ACK/NAK is transmitted using same set of tones 466 for the first transmission of ACK/NAK and orthogonal in time. In an aspect, the start time location for ACKCH corresponding to HARQ process is offset, shown at 470. For this example, the fist ACK/NAK is transmitted using tones 466 and symbols 452 for ACK 0 which corresponds to HARQ process 0; symbols 454 for ACK 1 which corresponds to HARQ process 1; symbols 456 for ACK 2 which corresponds to HARQ process 2; symbols 458 for ACK 3 which corresponds to HARQ process 3; and symbols 460 for ACK 4 which corresponds to HARQ process 4.

For the HARQ for the ACK/NAK the corresponding ACK for HARQ process is transmitted using ACKCH using different frequency location during each repeated transmission. For example, the UE receiving data for HARQ process 0 requires ACK/NAK to be repeated three times, the corresponding ACK/NAK (e.g. ACK 0) is transmitted using sub-block 480 for first transmission, and sub-blocks 482, and 484 to repeat ACK/NAK transmission. The frequency of sub-blocks used for transmitting repeated ACK/NAK may be a function of frequency used by resource block used for corresponding HARQ process plus an offset value. The offset value must be at least greater than value of tones used for the first transmission of the ACK/NAK. Thus, the set of tones used for sub-blocks 480, 482 and 484 are shown at 462, 464 and 466, respectively. In an aspect, the resources time and frequency location of the first block 480 of ACK TX pattern may be an implicit function of the time and frequency location of a corresponding data packet (e.g. transmitted using shared channel and HARQ process 0 at 402) and the time and frequency location of the subsequent blocks 482 and 484 of ACK TX pattern are an implicit function of the time and frequency location of the corresponding data packet (e.g. transmitted using HARQ process 0 at 402) using an offset.

In another aspect, the time and frequency location of the first block 480 of ACK TX pattern may be an implicit function of the time and frequency location of a corresponding data assignment packet (e.g. using control channel) and the time and frequency location of the subsequent blocks 482 and 484 of ACK TX pattern are an implicit function of the time and frequency location of the corresponding data assignment packet.

Figure 5:
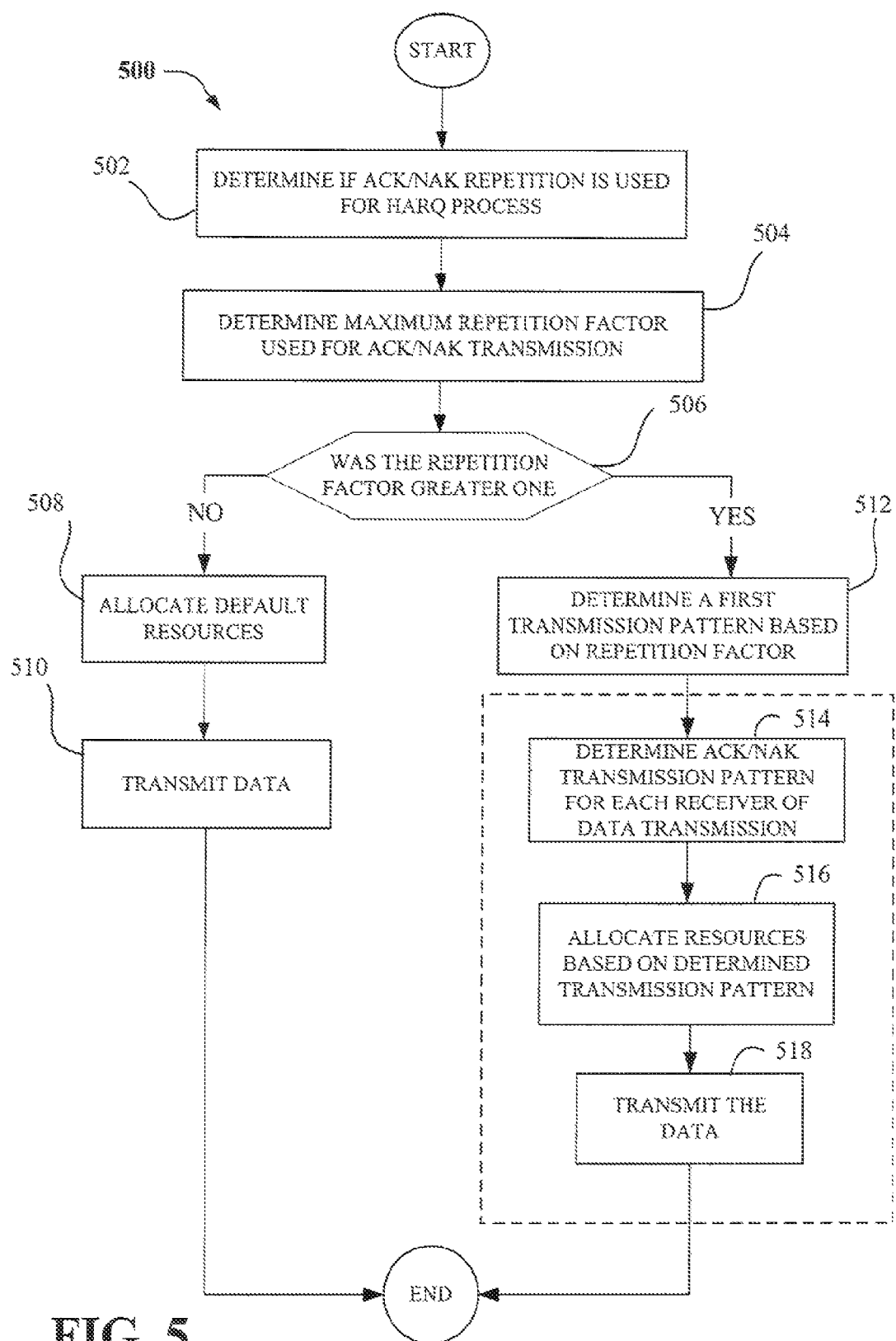
FIG. 5 illustrates a sample methodology for facilitating transmission data packets using a HARQ process.
Figure 6:
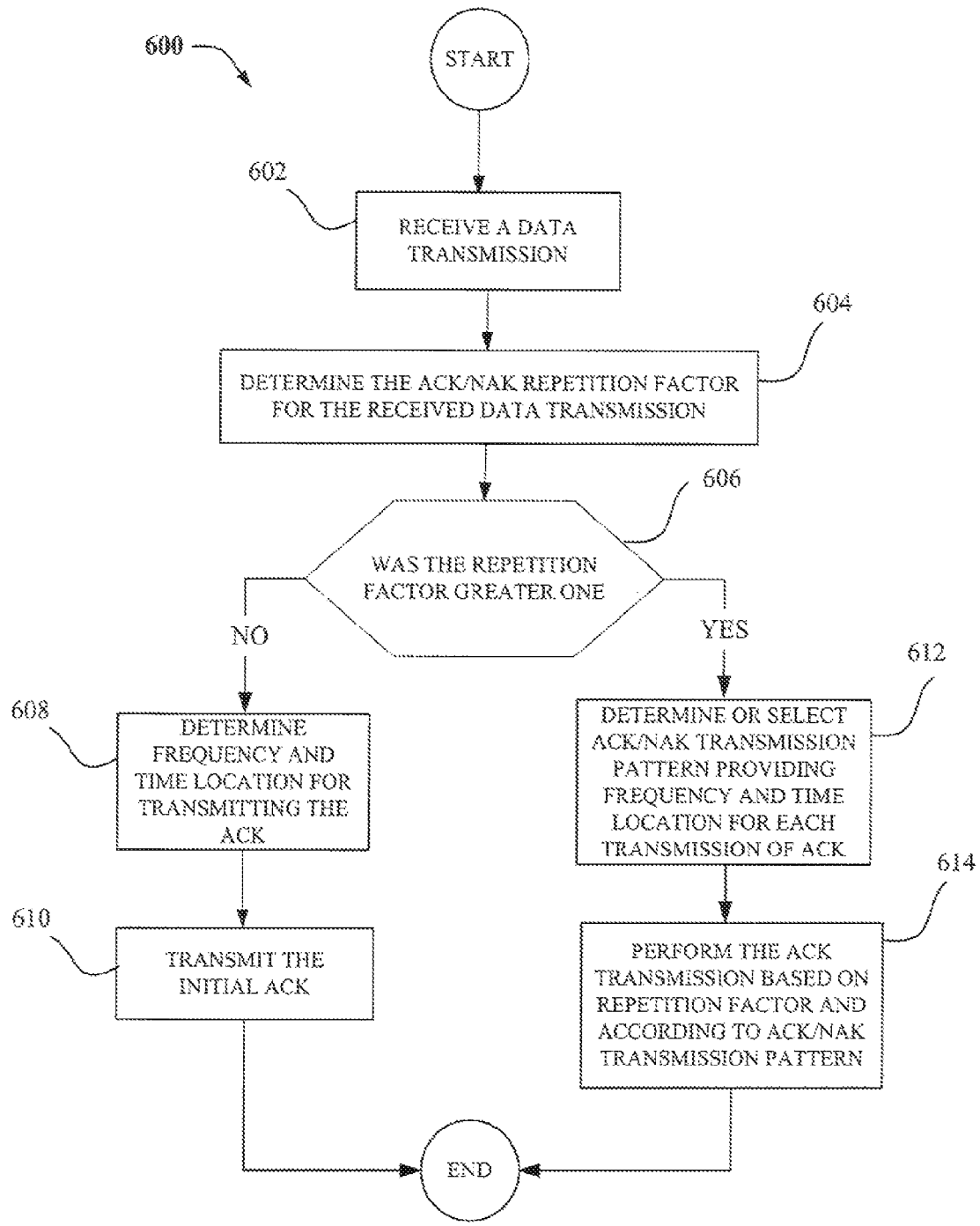
FIG. 6 illustrates a sample methodology for facilitating HARQ process for ACK/NAK transmission.

Referring to FIGS. 5-6, methodologies relating a mechanism for performing a HARQ for ACK/NAK retransmission. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 5, an example methodology 500 that facilitates transmission data packets using a HARQ process in wireless communication system according to an aspect is illustrated. Method 500 can facilitate transmitting data packets from a terminal (e.g., an enhanced Node base station, eNode B, access point (AP), base station or like mechanism) to one or more terminal devices (e.g. user equipment, UE, AT, or like mechanism) a wireless communication network. The method starts at 502, the method determines if ACK/NAK repetition scheme is used for HARQ process. In an aspect, system may request the Node B to start using the repetition scheme for duration of time or may make a request to use repetition scheme for a given radio frame. The method may access an indication stored in memory which indicates whether to use the repetition scheme. The method at 502, determines the maximum repetition factor (MRF) used for ACK/NAK transmission. The MRF may be the highest number of times a receiver of data packet is required to transmit ACK/NAK (e.g. number of times ACK/NAK would be received by the transmitter). The scheduler of the transmitter may determine the highest value by analyzing the repetition factor of each receiver of the data packet and selecting the highest repetition factor value. The maximum repetition factor may be preset for a Node B, for example the maximum repetition factor of 3, whether the maximum repetition allowed would three times. The method at 506, determines if the MRF is greater than one. If determined that the MRF is greater than one, the method executes 512, 514, 516 and 518. Otherwise, the method executes 508 and 510, wherein method at 508 allocates resources using a default transmission pattern (e.g. no splitting of frequency of ACKCH) and then transmits the data packets. At 512, the method determines the first transmission pattern for the radio frame as shown in FIG. 4 at 450. After determining the first transmission pattern for a radio frame, the method starts to execute 514, 516 and 518 for every HARQ process of a radio frame, for example ten as shown in FIG. 4. At 514, the method determines ACK/NAK transmission pattern (e.g. the transmission pattern made up by sub-blocks 480, 482 and 484 as shown in FIG. 4) for each receiver of the data packet. At 516, the method allocates resources based on determined ACK/NAK transmission pattern. The allocation of the resources may be transmitted to appropriate receivers prior their use. At 518, the method transmits data and wait the reception of ACK/NAK at appropriate frequency and time (e.g. sub-blocks) based on ACK/NAK transmission pattern.

Turning to FIG. 6, an example methodology 600 that facilitates HARQ process for ACK/NAK transmission in wireless communication system according to an aspect is illustrated. Method 600 can facilitate ACK/NAK transmission by a terminal (e.g., an enhanced Node base station, eNode B, access point (AP) base station or like mechanism) a wireless communication network. According to an aspect, at 602, the method receives a data transmission (e.g. data packet). At block 604, the method determines ACK/NAK repetition factor to use for responding to the received data transmission. The repetition factor provides how many times the ACK/NAK should be repeated. The ACK/NAK repetition factor may be determined using various techniques described above including retrieving from memory of the receiver. Also, the repetition factor may be received by the transmitter prior to receiving data transmission or along with data transmission. At 606, the method determines if the ACK/NAK repetition factor greater than one. If determined that ACK/NAK repetition factor is greater than one, then method executes 608 and 610. Otherwise, the method executes 612 and 614. At 608, the method according to an aspect determines the frequency and time location (e.g. transmission pattern) for transmitting ACK/NAK. Thereafter at 610, the method transmits the ACK/NAK using the designated resource block according to the transmission pattern. Referring specifically to 612, the methods determines or selects an ACK/NAK transmission pattern from a set of ACK/NAK transmission patterns, each providing transmission location in frequency and time of each sub-block. In an aspect, using a lookup table in memory, the method may extract the ACK/NAK transmission pattern (location of one or more sub-blocks in frequency and time). For example, if a repetition factor is three, the transmission pattern may be made up of sub-blocks 480, 482 and 486 as shown in FIG. 4 or any other frequency and time location combination, all orthogonal in time and frequency, for sub-block used for transmitting three ACKs. In an aspect, location of sub-block used for subsequent ACK/NAK transmission may be offset by two sets of symbols, for example, the second ACK 0 would be transmitted using set of symbols represented by 456 and third ACK 0 would be transmitted using set of symbols represented by 460 as shown in FIG. 4 (e.g. offset in time by symbols length of one sub-block). In aspect, the transmission location of a sub-block for the first or only ACK/NAK transmission for each received data packet, regardless of repetition factor, is same in frequency. Thus, the location of sub-blocks for transmitting ACK/NAK of subsequent received data packets must be offset by a set of frequency tones to avoid collision with ACK/NAK transmission for the subsequent received data packets. At block 614, the method performs ACK/NAK transmission based on the repetition factor and according to determined ACK/NAK transmission pattern.

Figure 7:
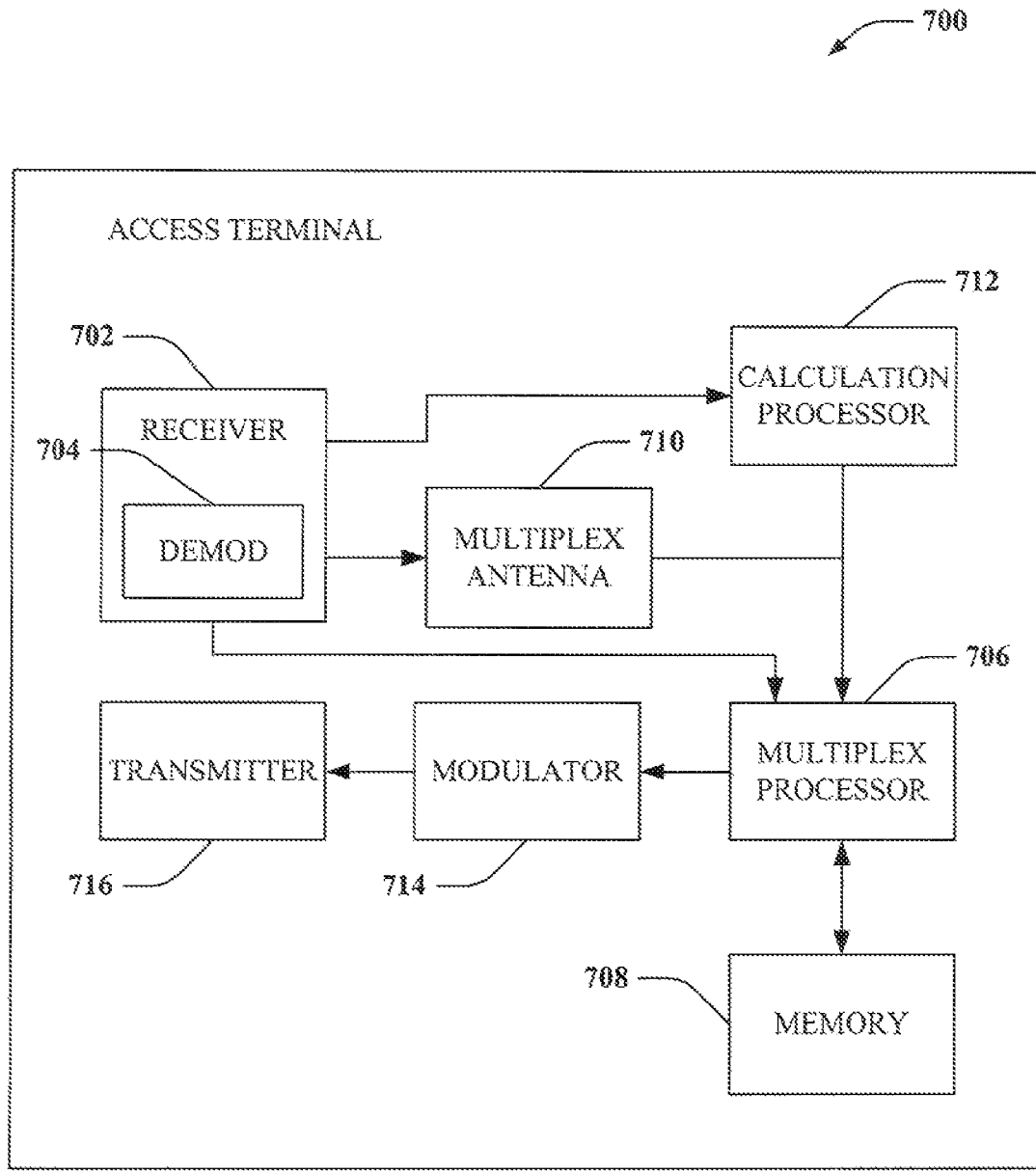
FIG. 7 depicts an exemplary access terminal that can provide feedback to communications networks.

FIG. 7 depicts an exemplary access terminal 700 that can provide feedback to communications networks, in accordance with one or more aspects. Access terminal 700 comprises a receiver 702 (e.g., an antenna) that receives a signal and performs typical actions on (e.g., filters, amplifies, down-converts, etc.) the received signal. Specifically, receiver 702 can also receive a service schedule defining services apportioned to one or more blocks of a transmission allocation period, a schedule correlating a block of downlink resources with a block of uplink resources for providing feedback information as described herein, or the like. Receiver 702 can comprise a demodulator 704 that can demodulate received symbols and provide them to a processor 706 for evaluation. Processor 706 can be a processor dedicated to analyzing information received by receiver 702 and/or generating information for transmission by a transmitter 716. Additionally, processor 706 can be a processor that controls one or more components access terminal 700, and/or a processor at analyzes information received by receiver 702, generates information for transmission by transmitter 716, and controls one or more components of access terminal 700. Additionally, processor 706 cal execute instructions for interpreting a correlation of uplink and downlink resources received by receiver 702, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 700 can additionally comprise memory 708 that is operatively coupled to processor 706 and that may store data to be transmitted, received, and the like. Memory 708 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to multiplex antenna 710 that can receive a scheduled correlation between one or more additional blocks of downlink transmission resources and a block of uplink transmission resources (e.g., to facilitate providing multiple NACK or ACK messages in a bitmap response). A multiplex processor 706 can include a multi-digit bitmap within a feedback message that provides an ACK or NACK message indicating whether a first downlink block and each of one or more additional downlink blocks are received or un-received, over a single uplink resource. Further, a calculation processor 712 can receive a feedback probability function, wherein the function limits a probability that a feedback message is provided by access terminal 700, as described herein, if the block of downlink transmission resources, or data associated therewith, is not received. Specifically, such probability function can be employed to reduce interference if multiple devices are reporting lost data simultaneously.

Access terminal 700 still further comprises a modulator 714 and a transmitter 716 that transmits the signal to, for instance, a base station, ac access point, another access terminal, a remote agent, etc. Although depicted as being separate from the processor 706, it is to be appreciated that signal generator 710 and indicator evaluator 712 may be part of processor 706 or a number of processors (not shown).

Figure 8:
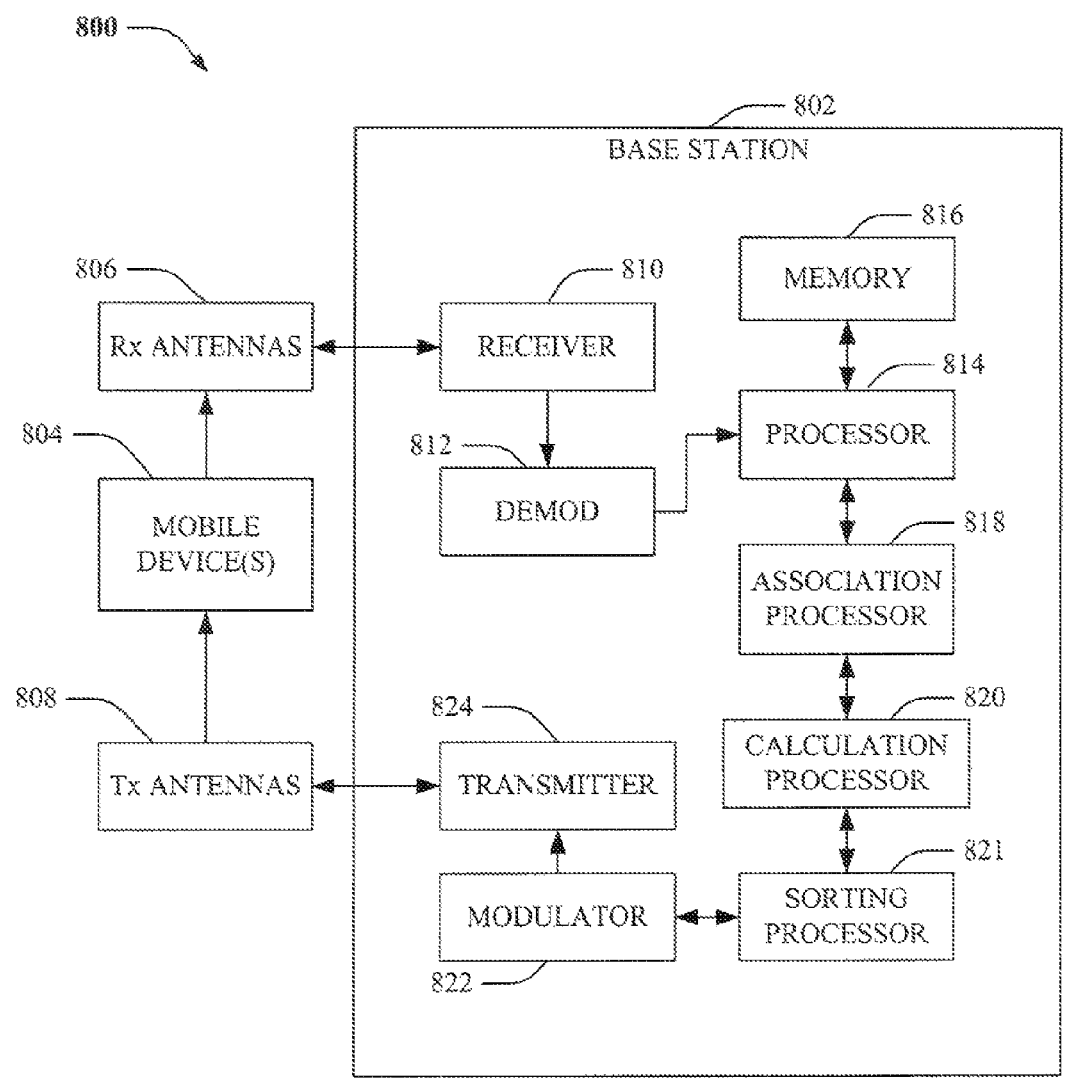
FIG. 8 illustrates an exemplary base station that can be employed in conjunction with a wireless networking environment disclosed herein.

FIG. 8 is an illustration of a system 800 that facilitates provision of feedback related to lost transmission data for an LTE network. System 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and can further comprise a signal recipient (not shown) that receives feedback data related to an un-received or indecipherable data packet. Additionally, receiver 810 is operatively associated with a demodulator 812 that demodulates received information. Demodulated symbols are analyzed by a processor 814 that is coupled to a memory 816 that stores information related to correlating uplink and downlink resources, providing dynamic and/or static correlations from a network, as well as data to be transmitted to or received from mobile device(s) 804 (or a disparate base station (not shown)), and/or any other suitable information related to performing the various actions and functions set forth herein.

Processor 814 is further coupled to an association processor 818 that can schedule a correlation during an allocation period between a block of downlink transmission resources and a block of uplink transmission resources for a multicast or broadcast service. Additionally, association processor 818 can further schedule a correlation between one or more additional blocks of uplink transmission resources and the block of downlink transmission resources, to enable receipt of a plurality of feedback messages for the downlink resource. As a result, a relative number of feedback messages related to the downlink resource can be determined. Moreover, association processor 818 can schedule a correlation between a plurality of blocks of downlink transmission resources and an uplink transmission resource for a multicast or broadcast service, such that a single bitmap included within a feedback message can indicate ACK or NACK information for the plurality of blocks of downlink transmission resources.

Association processor 818 can be coupled to a calculation processor 820 that generates a probability factor, which can limit a likelihood that a terminal device will provide the feedback message. The probability factor can be employed by base station 802 to reduce feedback interference from multiple terminal devices. Additionally, calculation processor 820 can generate a hash function transmitted by base station 802 that can indicate to each of a plurality of terminal devices a particular link transmission resource to use in submitting a feedback message. The hash function indication can be based at least in part on an access of each terminal device, a hash of each terminal identity, an identity of a service utilized by each terminal device, or block-specific information, or a combination thereof.

Additionally, calculation processor 820 can be coupled to a sorting processor 821 that can determine a number of received feedback messages related to the block of downlink transmission resources. For instance, if a block of downlink transmission resources is coupled with multiple uplink transmission resources (e.g., by association processor 818, as described above), two or more feedback messages can be received by base station 802 for the downlink resource. The sorting processor 821 can therefore identify what feedback messages correspond to the downlink block, which can indicate a retransmission priority for that downlink block. Furthermore, the sorting processor 821 can elect between retransmitting multiple blocks of downlink transmission resources based at least in part on the number of received feedback messages related to each block of downlink transmission resources.

Figure 9:
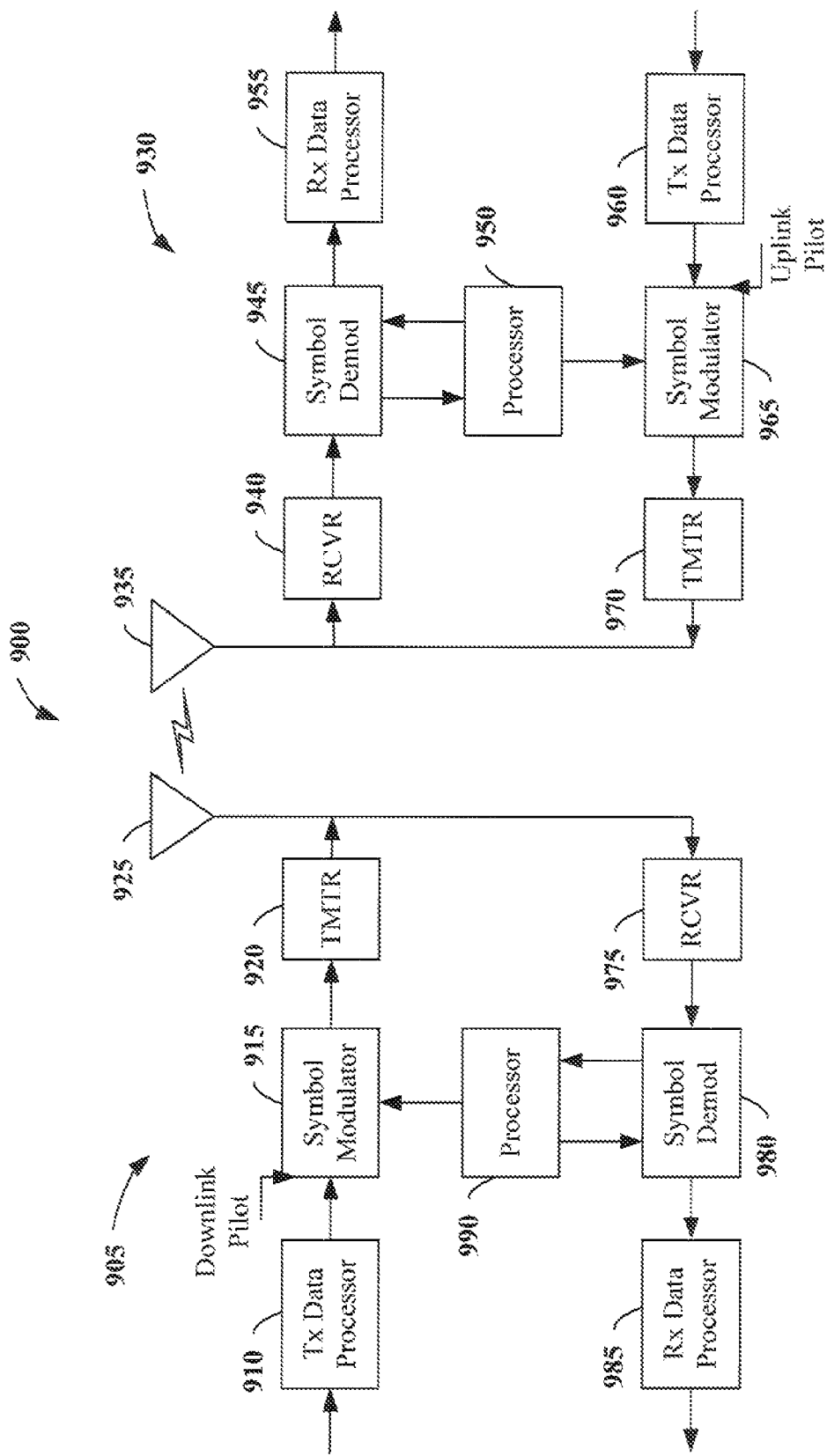
FIG. 9 depicts an exemplary system that facilitates providing feedback to a wireless communication environment in accordance with one or more aspects.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 915 multiplexes data and pilot symbol and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbols modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbols estimates for the uplink. An RX data processor 985 processes the data symbol estimates to recover the traffic data transmitted by terminal 930. A processor 990 performs channel estimation for each active terminal transmitting on the uplink. Multiple terminals may transmit pilot concurrently on the uplink on their respective assigned sets of pilot subbands, where the pilot subband sets may be interlaced.

Processors 990 and 950 direct (e.g., control, coordinate manage, etc.) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands far each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs),) digital signal processing devices (DSPDs), programmable logic devices (PLDs), field programmable gate arrays (FPGAs), processors, controllers, micro-controllers, microprocessors, other electronic units designed to perform the function described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
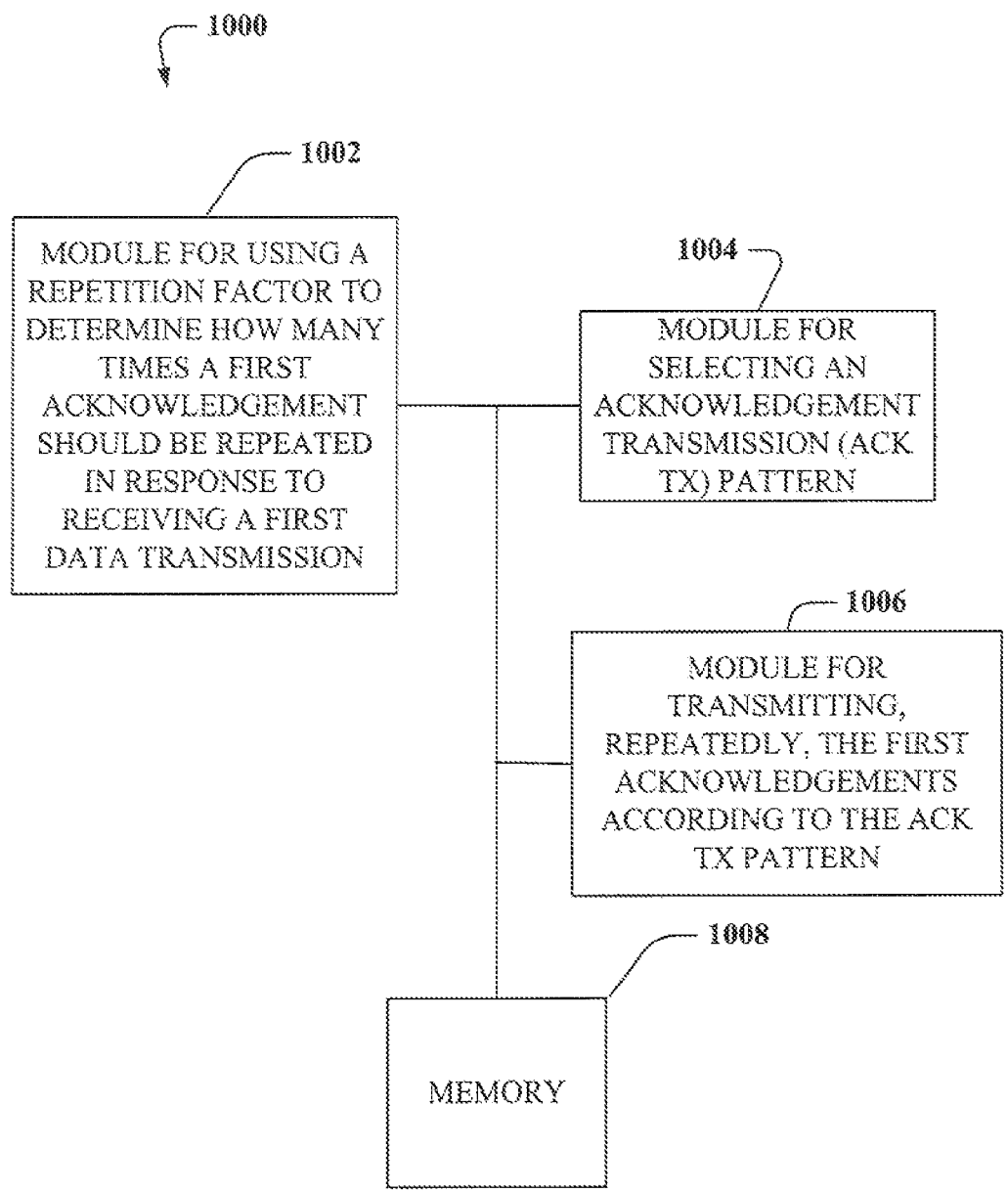
FIG. 10 depicts an exemplary system that facilities repeating ACK/NAK using a transmission pattern accordance with one or more aspects.

Referring now to FIG. 10, a system 1000 that facilitates repeating ACK/NAK using a transmit pattern in a wireless communication is illustrated. System 1000 may include a module 1002 for using a repetition factor to determine how many times a first acknowledgement should be repeated in response to receiving a first data transmission. A module 1004 for selecting an acknowledgement transmission (ACK TX) pattern and a module 1006 for transmitting, repeatedly, the first acknowledgements according to the ACK TX pattern. Modules 1002-1006 may be a processor or any electronic device and may be coupled to memory module 1008.

Figure 11:
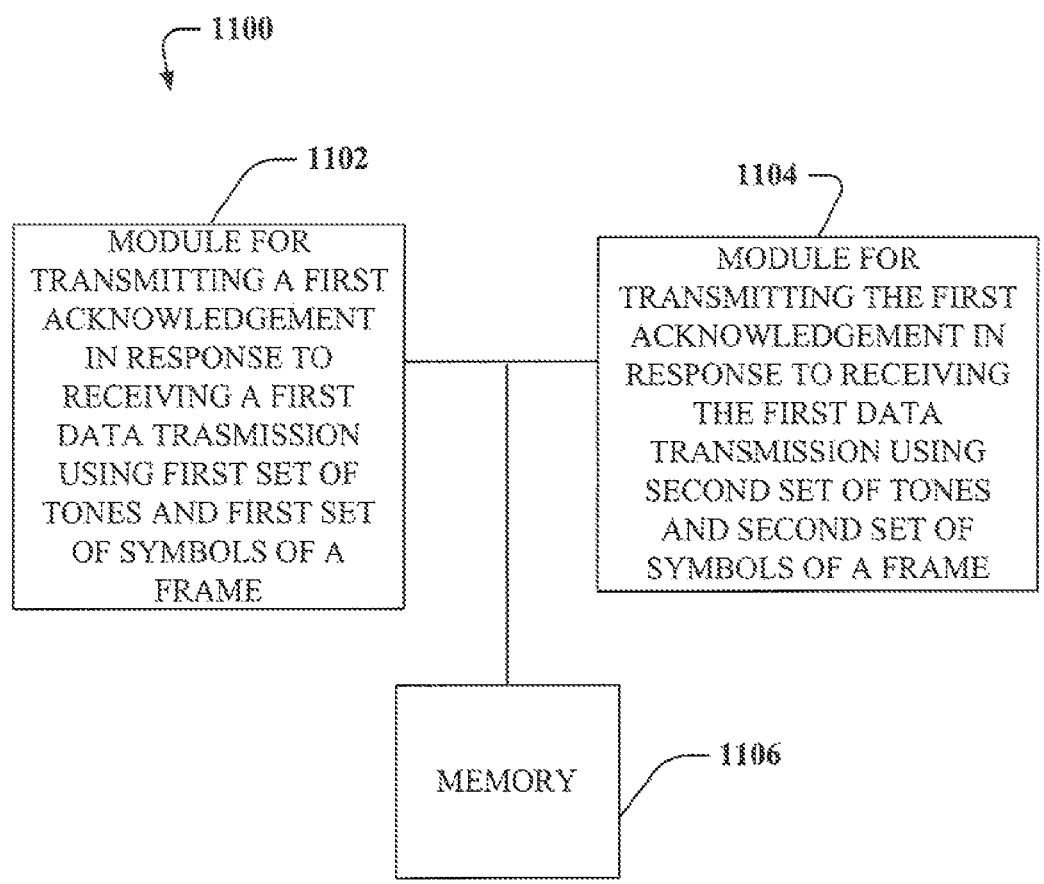
FIG. 11 depicts an exemplary system that facilities repeating ACK/NAK using a transmission pattern accordance with one or more aspects.

Referring now to FIG. 11, a system 1100 that facilitates repeating ACK/NAK using a transmit pattern in a wireless communication is illustrated. System 1100 may include a module 1102 for transmitting a first acknowledgement in response to receiving a first data transmission using first set of tones and first of symbols of a frame. A module and a module 1104 for transmitting the first acknowledgement in response, to receiving the first data transmission using second set of tones and second set of symbols of a frame. Modules 1102-1104 may be a processor or any electronic device and may be coupled to memory module 1106.

Figure 12:
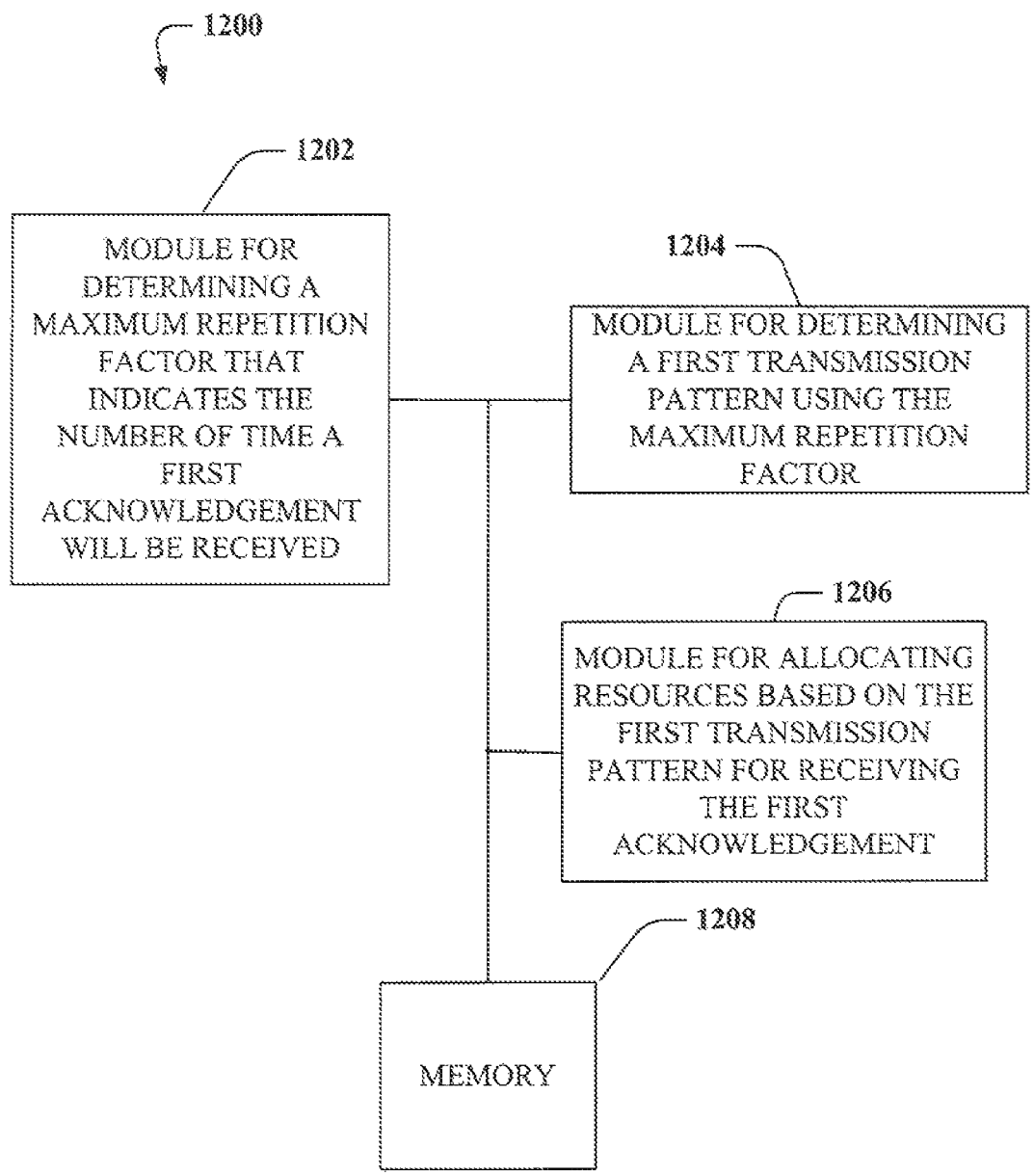
FIG. 12 depicts an exemplary system that facilities repeating ACK/NAK using a transmission pattern accordance with one or more aspects.

Referring now to FIG. 12, a system 1200 that facilitates repeating ACK/NAK using a transmit pattern in a wireless communication is illustrated. System 1200 may include a module 1202 for determining a maximum repetition factor that indicates the number of time a first acknowledgement will be received. A module 1204 for determining a first transmission pattern using the maximum repetition factor and a module 1206 for allocating resources based on the first transmission patters for receiving the first acknowledgement. Modules 1202-1206 may be a processor or any electronic device and may be coupled to memory module 1208.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alternations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method operable in a wireless communication system, the method comprising:
   using a repetition factor to determine how many times a first acknowledgement should be repeatedly transmitted, the first acknowledgement being transmitted in response to receiving a first data transmission;
   selecting an acknowledgement transmission (ACK TX) pattern using the repetition factor, wherein the ACK TX pattern comprises frequency and time location of a plurality of blocks used for transmitting the first acknowledgement, wherein selecting the ACK TX pattern comprises selecting a first ACK TX pattern having a plurality of blocks and allocating to each block of the plurality of blocks different time and frequency resources for transmitting the first acknowledgement; and
   transmitting, repeatedly, the first acknowledgement according to the ACK TX pattern, wherein the transmitting comprises frequency division multiplexing.

2. The method of claim 1, wherein selecting the ACK TX pattern comprises selecting the ACK TX pattern as an implicit function of a time and frequency location of the corresponding first data transmission, wherein the first data transmission comprises data packets.

3. The method of claim 1, wherein selecting the ACK TX pattern comprises selecting the ACK TX pattern as an implicit function of a time and frequency location of the corresponding first data transmission, wherein the first data transmission comprises data assignment packets.

4. The method of claim 1, wherein using the repetition factor comprises receiving the repetition factor.

5. The method of claim 1, wherein selecting the ACK TX pattern comprises selecting from a plurality of ACK TX patterns using the repetition factor.

6. The method of claim 1, wherein
   allocating time and frequency resources for each block of the plurality of blocks comprises allocating time and frequency resources to a first block as an implicit function of the time and frequency location of the corresponding first data transmission and allocating time and frequency resources for subsequent blocks as an implicit function of the time and frequency location of the corresponding first data transmission, wherein the first data transmission comprises a data packet.

7. The method of claim 1, wherein
   allocating time and frequency resources for each block of the plurality of blocks comprises allocating time and frequency resources to a first block as an implicit function of the time and frequency location of the corresponding first data transmission and allocating time and frequency resources for subsequent blocks as an implicit function of the time and frequency location of the corresponding first data transmission, wherein the first data transmission comprises a data assignment packet.

8. A method operable in a wireless communication system, the method comprising:
   transmitting a first acknowledgement in response to receiving a first data transmission using a first set of tones and a first set of symbols of a frame; and
   transmitting the first acknowledgement in response to receiving the first data transmission using a second set of tones and a second set of symbols of the frame, based at least in part on a repetition factor, wherein the first set of tones and the second set of tones are orthogonal to each other and the first set of symbols and the second set of symbols are orthogonal to each other, and wherein the repetition factor determines how many times the first acknowledgement should be repeatedly transmitted.

9. The method of claim 8, further comprising:
transmitting the first acknowledgement in response to receiving the first data transmission using a third set of tones and a third set of symbols of the frame, based at least in part on the repetition factor, wherein the first set of tones, the second set of tones and the third set of tones are orthogonal to each other and the first set of symbols, the second set of symbols and the third set of symbols are orthogonal to each other.

10. An apparatus operable in a wireless communication system, the apparatus comprising:
means for using a repetition factor to determine how many times a first acknowledgement should be repeatedly transmitted, the first acknowledgement being transmitted in response to receiving a first data transmission;
means for selecting an acknowledgement transmission (ACK TX) pattern using the repetition factor, wherein the ACK TX pattern comprises frequency and time location of a plurality of blocks used for transmitting the first acknowledgement, wherein the means for selecting the ACK TX pattern comprises means for selecting a first ACK TX pattern having a plurality of blocks and means for allocating to each block of the plurality of blocks different time and frequency resources for transmitting the first acknowledgement; and
means for transmitting, repeatedly, the first acknowledgements according to the ACK TX pattern, wherein the transmitting comprises frequency division multiplexing.

11. The apparatus of claim 10, wherein the means for selecting the ACK TX pattern comprises means for selecting the ACK TX pattern as an implicit function of time and frequency location of the corresponding first data transmission, wherein the first data transmission comprises data packets.

12. The apparatus of claim 10, wherein the means for selecting the ACK TX pattern comprises means for selecting the ACK TX pattern as an implicit function of time and frequency location of the corresponding first data transmission, wherein the first data transmission comprises data assignment packets.

13. The apparatus of claim 10, wherein the means for using the repetition factor comprises means for receiving the repetition factor.

14. The apparatus of claim 10, wherein the means for selecting the ACK TX pattern comprises means for selecting from a plurality of ACK TX patterns using the repetition factor.

15. The apparatus of claim 10, wherein
the means for allocating time and frequency resources for each block of the plurality of blocks comprises means for allocating time and frequency resources to a first block as an implicit function of the time and frequency location of the corresponding first data transmission and means for allocating time and frequency resources for subsequent blocks as an implicit function of the time and frequency location of the corresponding first data transmission, wherein the first data transmission comprises a data packet.

16. The apparatus of claim 10, wherein
the means for allocating time and frequency resources for each block of the plurality of blocks comprises means for allocating time and frequency resources to a first block as an implicit function of the time and frequency location of the corresponding first data transmission and comprises means for allocating time and frequency resources for subsequent blocks as an implicit function of the time and frequency location of the corresponding first data transmission, wherein the first data transmission comprises a data assignment packet.

17. An apparatus operable in a wireless communication system, the apparatus comprising:
means for transmitting a first acknowledgement in response to receiving a first data transmission using a first set of tones and a first set of symbols of a frame; and
means for transmitting the first acknowledgement in response to receiving the first data transmission using a second set of tones and a second set of symbols of the frame, based at least in part on a repetition factor, wherein the first set of tones and the second set of tones are orthogonal to each other and the first set of symbols and the second set of symbols are orthogonal to each other, and wherein the repetition factor determines how many times the first acknowledgment should be repeatedly transmitted.

18. The apparatus of claim 17, further comprising:
means for transmitting the first acknowledgement in response to receiving the first data transmission using a third set of tones and a third set of symbols of the frame, based at least in part on the repetition factor, wherein the first set of tones, the second set of tones and the third set of tones are orthogonal to each other and the first set of symbols, the second set of symbols and the third set of symbols are orthogonal to each other.

19. A computer program product, comprising:
a non-transitory computer-readable medium comprising:
code for using a repetition factor to determine how many times a first acknowledgement should be repeatedly transmitted, the first acknowledgement being transmitted in response to receiving a first data transmission;
code for selecting an acknowledgement transmission (ACK TX) pattern using a repetition factor, wherein the ACK TX pattern comprises frequency and time location of a plurality of blocks used for transmitting the first acknowledgement, wherein the code for selecting the ACK TX pattern comprises code for selecting a first ACK TX pattern having a plurality of blocks and code for allocating to each block of the plurality of blocks different time and frequency resources for transmitting the first acknowledgement; and
code for transmitting, repeatedly, the first acknowledgements according to the ACK TX pattern, wherein the transmitting comprises frequency division multiplexing.

20. The computer program product of claim 19, wherein code for selecting the ACK TX pattern comprises code for selecting the ACK TX pattern as an implicit function of time and frequency location of the corresponding first data transmission, wherein the first data transmission comprises of data packets.

21. The computer program product of claim 19, wherein code for selecting the ACK TX pattern comprises code for selecting the ACK TX pattern as an implicit function of time and frequency location of the corresponding first data transmission, wherein the first data transmission comprises of data assignment packets.

22. A computer program product comprising:

a non-transitory computer-readable medium comprising:

code for transmitting a first acknowledgement in response to receiving a first data transmission using a first set of tones and a first set of symbols of a frame; and code for transmitting the first acknowledgement in response to receiving the first data transmission using a second set of tones and a second set of symbols of the frame, based at least in part on a repetition factor, wherein the first set of tones and the second set of tones are orthogonal to each other and the first set of symbols and the second set of symbols are orthogonal to each other, and wherein the repetition factor determines how many times the first acknowledgment should be repeatedly transmitted.

23. An apparatus operable in a wireless communication system, the apparatus comprising:

at least one processor configured to:

use a repetition factor to determine how many times a first acknowledgement should be repeatedly transmitted, the first acknowledgment being transmitted in response to receiving a first data transmission;

select an acknowledgement transmission (ACK TX) pattern using the repetition factor, wherein the ACK TX pattern comprises frequency and time location of a plurality of blocks used for transmitting the first acknowledgement, wherein selecting the ACK TX pattern comprises selecting a first ACK TX pattern having a plurality of blocks and allocating to each block of the plurality of blocks different time and frequency resources for transmitting the first acknowledgement; and transmit, repeatedly, the first acknowledgements according to the ACK TX pattern, wherein the transmitting comprises frequency division multiplexing.

24. The apparatus of claim 23, wherein the ACK TX pattern is an implicit function of the time and frequency location of the corresponding first data transmission, wherein the first data transmission comprises data packets.

25. The apparatus of claim 23, wherein the ACK TX pattern is an implicit function of the time and frequency location of the corresponding first data transmission, wherein the first data transmission comprises data assignment packets.

26. The apparatus of claim 23, wherein the ACK TX pattern comprises a first ACK TX pattern having a plurality of blocks and allocating to each block of the plurality of blocks different time and frequency resources for transmitting the first acknowledgement.

27. An apparatus operable in a wireless communication system, the apparatus comprising:

at least one processor configured to:

transmit a first acknowledgement in response to receiving a first data transmission using a first set of tones and a first set of symbols of a frame; and transmit the first acknowledgement in response to receiving the first data transmission using a second set of tones and a second set of symbols of the frame, based at least in part on a repetition factor, wherein the first set of tones and the second set of tones are orthogonal to each other and the first set of symbols and the second set of symbols are orthogonal to each other, and wherein the repetition factor determine how many times the first acknowledgement should be repeatedly transmitted.

28. An apparatus operable in a wireless communication system, the apparatus comprising:

means for determining a maximum repetition factor that indicates the number of times a first acknowledgement will be repeatedly transmitted;

means for determining a first transmission pattern using the maximum repetition factor, wherein the first transmission pattern comprises frequency and time location of plurality of blocks used for receiving the first acknowledgement, wherein each of the plurality of blocks used for receiving the first acknowledgment is allocated different time and frequency resources; and means for allocating resources based on the first transmission pattern for receiving the first acknowledgement, wherein the first acknowledgment is transmitted using frequency division multiplexing.

29. The apparatus of claim 28, wherein the means for determining the first transmission pattern comprises means for selecting the first transmission pattern from a list of transmission patterns.

30. The apparatus of claim 29, wherein the transmission patterns are an implicit function of the time and frequency location of a data packet.

31. The apparatus of claim 29, wherein the transmission patterns are an implicit function of the time and frequency location of a data assignment packet.

32. The apparatus of claim 28, wherein the means for determining a maximum repetition factor comprises means for selecting a highest repetition factor used for repeating acknowledgement for a data packet to be transmitted.

33. The apparatus of claim 28, wherein the means for determining the first transmission pattern comprises means for selecting the first transmission pattern using the repetition factor.

34. The apparatus of claim 28, wherein the means for selecting the first transmission comprises means for selecting the first transmission pattern having a first block, a second block, and a third block wherein each block is orthogonal in time and frequency and used for transmitting first acknowledgement.

35. The apparatus of claim 34, wherein the means for allocating resources comprises means for allocating the time and frequency resources of the first block and the second block for receiving the first acknowledgement.

36. A method operable in a wireless communication system, the method comprising:

determining a maximum repetition factor that indicates the number of times a first acknowledgement will be repeatedly transmitted;

determining a first transmission pattern using the maximum repetition factor, wherein the first transmission pattern comprises frequency and time location of plurality blocks used for receiving the first acknowledgement, wherein each of the plurality of blocks used for receiving the first acknowledgment is allocated different time and frequency resources; and allocating resources based on the first transmission pattern for receiving the first acknowledgement, wherein the first acknowledgment is transmitted using frequency division multiplexing.

37. The method of claim 36, wherein determining the first transmission pattern comprises selecting the first transmission pattern from a list of transmission patterns.

38. The method of claim 37, wherein selecting the transmission pattern comprises selecting the transmission pattern as an implicit function of the time and frequency location of a corresponding first data transmission, wherein the first data transmission comprises data packets.

39. The method of claim 37, wherein selecting the transmission pattern comprises selecting the transmission pattern as an implicit function of the time and frequency location of a corresponding first data transmission, wherein the first data transmission comprises data assignment packets.

40. The method of claim 37, wherein determining a maximum repetition factor comprises selecting a highest repetition factor used for repeating acknowledgement for a data packet to be transmitted.

41. The method of claim 37, wherein determining the first transmission pattern comprises selecting the first transmission pattern using the repetition factor.

42. The method of claim 41, wherein selecting the first transmission pattern comprises selecting the first transmission pattern having a first block, a second block, and a third block wherein each block is orthogonal in time and frequency and used for transmitting the first acknowledgement.

43. The method of claim 42, wherein allocating resources comprises allocating the time and frequency resources of the first block and the second block for receiving the first acknowledgement.

44. A computer program product, comprising:
 a non-transitory computer-readable medium comprising:
  code for determining a maximum repetition factor that indicates the number of times a first acknowledgement will be repeatedly transmitted;
  code for determining a first transmission pattern using the maximum repetition factor, wherein the first transmission pattern comprises frequency and time location of a plurality blocks used for receiving the first acknowledgement, wherein each of the plurality of blocks used for receiving the first acknowledgment is allocated different time and frequency resources; and
  code for allocating resources based on the first transmission pattern for receiving the first acknowledgement, wherein the first acknowledgment is transmitted using frequency division multiplexing.

45. An apparatus operable in a wireless communication system, the apparatus comprising:
 at least one processor configured to:
  determine a maximum repetition factor that indicates the number of times a first acknowledgement will be repeatedly transmitted;
  determine a first transmission pattern using the maximum repetition factor, wherein the first transmission pattern comprises of frequency and time location of plurality blocks used for receiving the first acknowledgement, wherein each of the plurality of blocks used for receiving the first acknowledgment is allocated different time and frequency resources; and
  allocate resources based on the first transmission pattern for receiving the first acknowledgement, wherein the first acknowledgment is transmitted using frequency division multiplexing.

46. A method operable in a wireless communication, the method comprising:
 using a repetition factor to determine how many times a first acknowledgement should be repeatedly transmitted, the first acknowledgment being transmitted in response to receiving a first data transmission;
 selecting an acknowledgement transmission (ACK TX) pattern using the repetition factor, wherein the ACK TX pattern comprises resource information for a plurality of blocks used for transmitting the first acknowledgement, wherein selecting the ACK TX pattern comprises selecting a first ACK TX pattern having a plurality of blocks and allocating to each block of the plurality of blocks different time and frequency resources for transmitting the first acknowledgement; and
 transmitting, repeatedly, the first acknowledgement according to the ACK TX pattern, wherein the transmitting comprises frequency division multiplexing.

47. The method of claim 46, wherein selecting the ACK TX pattern comprises selecting the ACK TX pattern wherein the resources comprises time, frequency and code information.

* * * * *